US00RE46894E

(19) United States
(12) Reissued Patent
Laitta et al.

(10) Patent Number: US RE46,894 E
(45) Date of Reissued Patent: Jun. 19, 2018

(54) HANDRAIL

(71) Applicant: S.R. Smith, LLC, Canby, OR (US)

(72) Inventors: Richard P. Laitta, Lake Oswego, OR (US); Darrin Johnson, Portland, TN (US)

(73) Assignee: S.R. Smith, LLC, Canby, OR (US)

(21) Appl. No.: 29/607,131

(22) Filed: Jun. 9, 2017

Related U.S. Patent Documents

Reissue of:
(64) Patent No.: Des. 706,448
Issued: Jun. 3, 2014
Appl. No.: 29/443,445
Filed: Jan. 17, 2013

U.S. Applications:
(62) Division of application No. 29/566,813, filed on Jun. 2, 2016, which is an application for the reissue of Pat. No. Des. 706,448.

(51) LOC (11) Cl. ..... 25-02
(52) U.S. Cl.
USPC ..... D25/41.1
(58) Field of Classification Search
USPC ..... D25/38.1, 41.1; D8/303, 306, 307, 310, D8/311, 313–317; D23/304
(Continued)

(56) References Cited

U.S. PATENT DOCUMENTS

D194,835 S * 3/1963 Prizler et al. ..... D12/414
4,077,173 A * 3/1978 Rozanski ..... 52/169.8
(Continued)

OTHER PUBLICATIONS

Stallion Stainless Handrails (Australia): photo of stainless steel handrail, http://www.stallionstainless.com.au/gallery-2014-2/stainless-steel-handrails visited May 16, 2016.
(Continued)

*Primary Examiner* — Darlington Ly
(74) *Attorney, Agent, or Firm* — Stoel Rives LLP

(57) CLAIM

We claim the ornamental design for a handrail, as shown and described.

DESCRIPTION

[FIG. 1 is a perspective view of a handrail.]
[FIG. 2 is a front elevation view of the handrail of FIG. 1. The opposing rear elevation view is a mirror image of the illustrated view.]
[FIG. 3 is a top plan view of the handrail of FIG. 1.]
[FIG. 4 is a bottom plan view of the handrail of FIG. 1.]
[FIG. 5 is a left side elevation view of the handrail of FIG. 1; and,]
[FIG. 6 is a right side elevation view of the handrail of FIG. 1.]
*FIG. 7 is a perspective view of an alternate handrail.*
*FIG. 8 is a front elevation view of the handrail of FIG. 7. The opposing rear elevation view is a mirror image of the illustrated view.*
*FIG. 9 is a top plan view of the handrail of FIG. 7.*
*FIG. 10 is a bottom plan view of the handrail of FIG. 7.*
*FIG. 11 is a left side elevation view of the handrail of FIG. 7; and,*
*FIG. 12 is a right side elevation view of the handrail of FIG. 7.*
[In FIG. 4, the portion of the bottom view bounded by the broken lines is for illustrative purposes only and forms] *The broken lines in the drawings illustrate portions of the handrail that form* no part of the claimed design.

1 Claim, 2 Drawing Sheets

Matter enclosed in heavy brackets [ ] appears in the original patent but forms no part of this reissue; matter printed in italics indicates the additions made by reissue.

(58) Field of Classification Search

CPC ..... A47K 3/003; A47K 3/001; A47K 3/12; A47K 3/125; A47K 3/281; A47K 17/022; A47K 17/02; A47K 17/024; A47K 2201/02; A61G 7/1003; A61G 7/1005; E04G 5/14; E04G 5/147; E04G 3/30; E04H 4/144; E04H 4/1227; E06C 7/181; E06C 7/182; Y10T 16/498; Y10T 16/502; Y10T 16/513; Y10T 16/516; Y10T 16/469; Y10T 16/476; Y10T 16/459; Y10T 16/4644; Y10T 16/4652; Y10T 16/466; Y10T 403/4625

See application file for complete search history.

(56) References Cited

U.S. PATENT DOCUMENTS

| | | | | | |
|---|---|---|---|---|---|
| 4,887,323 | A | * | 12/1989 | DiVito et al. | 4/577.1 |
| 5,727,264 | A | * | 3/1998 | Craig et al. | E04H 4/0037 4/489 |
| D409,311 | S | * | 5/1999 | Victor et al. | D25/41.1 |
| 6,185,875 | B1 | * | 2/2001 | Victor et al. | 52/9 |
| 6,601,245 | B2 | * | 8/2003 | Weiss | E04H 4/144 182/106 |
| D589,629 | S | * | 3/2009 | French | D25/41.1 |
| D608,018 | S | * | 1/2010 | Stimpson et al. | D25/41.1 |
| D706,449 | S | * | 6/2014 | Laitta | D25/41.1 |
| D706,450 | S | * | 6/2014 | Laitta | D25/41.1 |
| D706,451 | S | * | 6/2014 | Laitta | D25/41.1 |
| D706,452 | S | * | 6/2014 | Laitta | D25/41.1 |
| D733,925 | S | * | 7/2015 | Collier | D25/41.1 |
| D735,091 | S | * | 7/2015 | Slaughenhoupt | D12/115 |
| D756,531 | S | * | 5/2016 | Hagerty | D25/41.1 |
| 2001/0006231 | A1 | * | 7/2001 | McCracken | 256/59 |

OTHER PUBLICATIONS

Metalcraft Engineering Co., Ltd (New Zealand): photo of stairway handrail, http://www.theglassrackingcompany.com/architectural_metalwork/external_balustrades visited May 16, 2016.

AJD Bespoke Stairs (Ireland): photo of stairway handrail, http://ajdstairs.com/stairs/view/curved-concrete-stairs-2, visited May 16, 2016.

Hercules Custom Iron (Walkersville, MD): photo of metal handrail, http://www.herculescustomiron.com/img/gallery/steel_aluminum_railing/steel_aluminum_railing_14.jpg Visited May 16, 2016.

U.S. Appl. No. 29/566,813 titled "Handrail", filed Jun. 2, 2016 (parent to the present application).

U.S. Appl. No. 29/607,140 titled "Handrail", filed Jun. 9, 2017 (Divisional of U.S. Appl. No. 29/566,813).

* cited by examiner

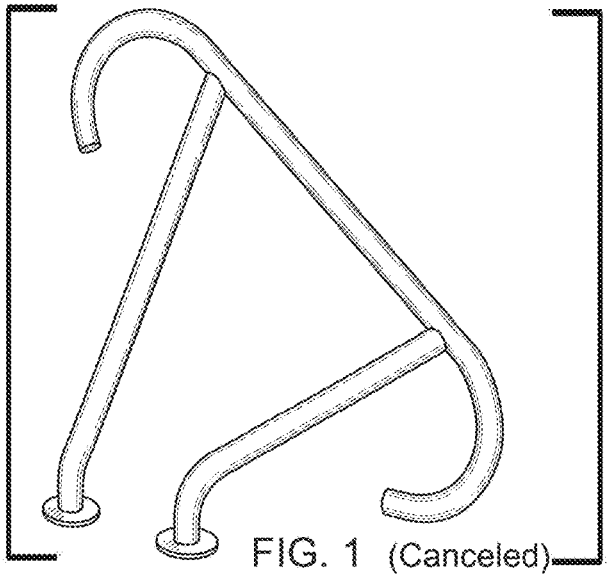
FIG. 1 (Canceled)
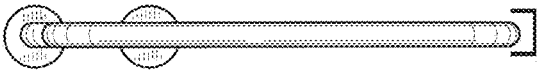
FIG. 3 (Canceled)
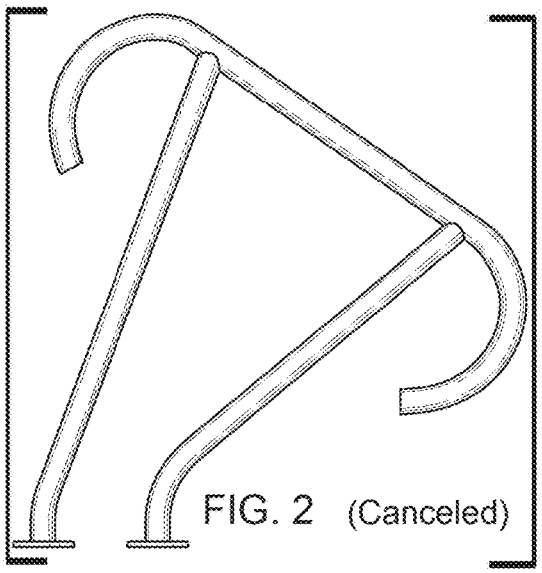
FIG. 2 (Canceled)
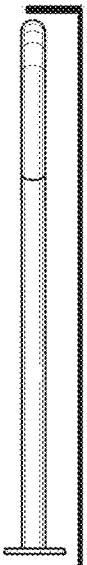
FIG. 5 (Canceled)
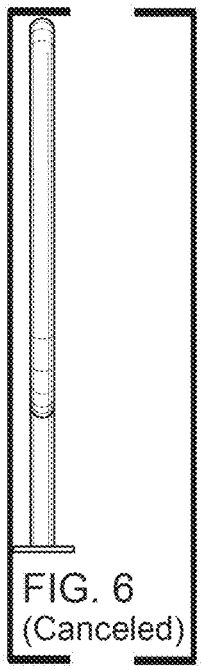
FIG. 6 (Canceled)
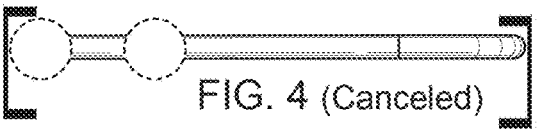
FIG. 4 (Canceled)

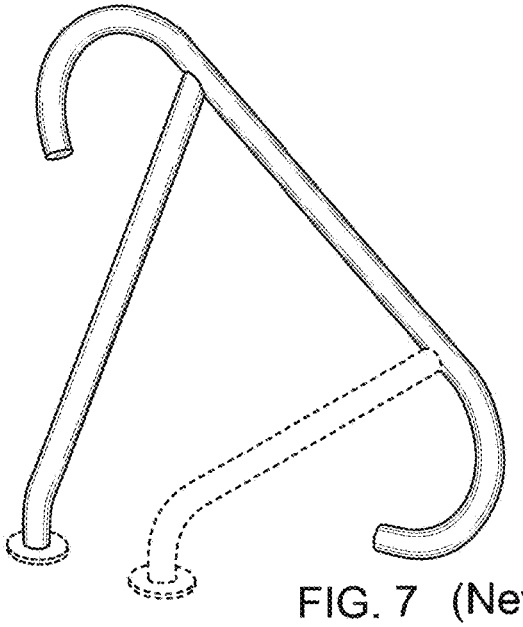
FIG. 7 (New)
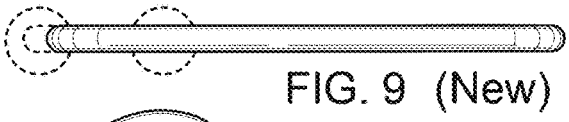
FIG. 9 (New)
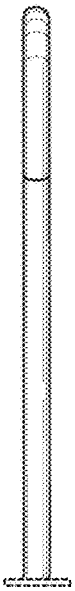
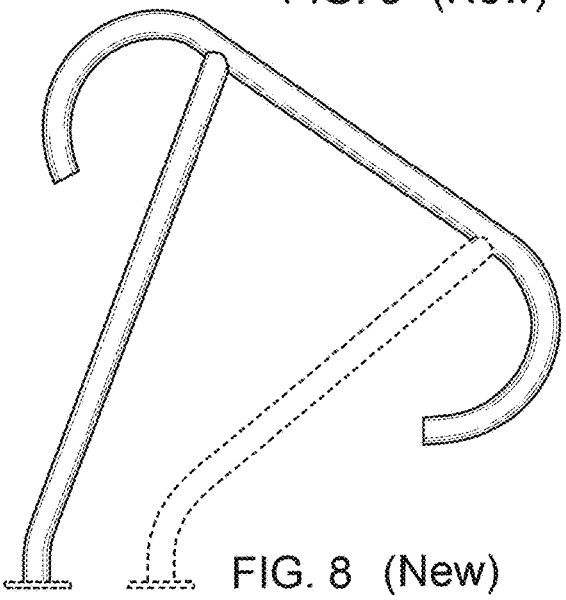
FIG. 8 (New)
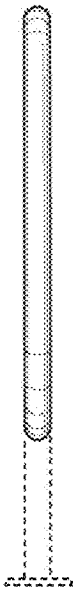
FIG. 11 (New)
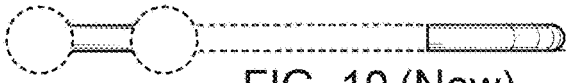
FIG. 10 (New)
FIG. 12 (New)